United States Patent
Kashiwabara et al.

(10) Patent No.: US 12,172,352 B2
(45) Date of Patent: Dec. 24, 2024

(54) SCREW FOR INJECTION MOLDING MACHINE, INJECTION DEVICE, AND INJECTION MOLDING MACHINE

(71) Applicant: THE JAPAN STEEL WORKS, LTD., Tokyo (JP)

(72) Inventors: Yugo Kashiwabara, Tokyo (JP); Takuya Yufu, Tokyo (JP); Kazuma Nakagawa, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 505 days.

(21) Appl. No.: 17/498,889

(22) Filed: Oct. 12, 2021

(65) Prior Publication Data

US 2022/0111571 A1    Apr. 14, 2022

(30) Foreign Application Priority Data

Oct. 13, 2020 (JP) ................... 2020-172371

(51) Int. Cl.
B29C 45/47 (2006.01)
B29C 45/60 (2006.01)
(Continued)

(52) U.S. Cl.
CPC .............. B29C 45/47 (2013.01); B29C 45/60 (2013.01); B29C 45/62 (2013.01); B29C 45/74 (2013.01);
(Continued)

(58) Field of Classification Search
CPC .............. A61C 17/225; B29C 45/1676; B29C 45/14336; B29C 65/48; B29C 66/02245;
(Continued)

(56) References Cited

U.S. PATENT DOCUMENTS 5,004,352 A * 4/1991 Tamura ................... B29C 45/60
366/79
6,042,362 A * 3/2000 Mitsui ..................... B29C 45/50
425/550
(Continued)

FOREIGN PATENT DOCUMENTS

JP 7-164497 A 6/1995
JP 4977258 B1 7/2012
(Continued)

OTHER PUBLICATIONS

JP2005169646 (Year: 2005).*
(Continued)

*Primary Examiner* — Jeffrey M Wollschlager
*Assistant Examiner* — Guy F Mongelli
(74) *Attorney, Agent, or Firm* — Sughrue Mion, PLLC

(57) ABSTRACT

A stepped flight is formed on a screw of an injection molding machine. The stepped flight is a flight in which a step-shaped step portion is formed on a top portion thereof. The top portion of the flight includes a large diameter portion on an upstream side and a land portion on a downstream side. When a gap ratio m of a gap $H_1$ between the land portion and a bore of the heating cylinder to a gap $H_2$ between the large diameter portion and the bore is defined as $H_1/H_2$, the gap ratio m is selected to be $2.3 \leq m \leq 6.4$.

12 Claims, 6 Drawing Sheets

(51) Int. Cl.
  *B29C 45/62* (2006.01)
  *B29C 45/74* (2006.01)
  *B29C 45/76* (2006.01)

(52) U.S. Cl.
  CPC ...... *B29C 45/76* (2013.01); *B29C 2945/7613* (2013.01)

(58) Field of Classification Search
  CPC ................ B29C 66/028; B29C 66/742; B29C 45/0001; B29C 45/14008; B29C 66/72321; B29L 2031/425
  See application file for complete search history.

(56) References Cited

U.S. PATENT DOCUMENTS

| | | | | |
|---|---|---|---|---|
| 6,497,508 | B1* | 12/2002 | Womer | B29B 7/421 366/90 |
| 2003/0042640 | A1* | 3/2003 | Kubota | B29C 45/82 425/589 |
| 2010/0215792 | A1* | 8/2010 | Marumoto | B29C 45/52 425/207 |
| 2013/0200552 | A1 | 8/2013 | Kariya et al. | |
| 2014/0001678 | A1* | 1/2014 | Hara | B29C 45/60 264/328.14 |
| 2016/0158980 | A1* | 6/2016 | Fitzpatrick | B29C 45/18 264/328.15 |
| 2017/0246787 | A1* | 8/2017 | Mazzocca | B29B 7/489 |
| 2018/0022003 | A1* | 1/2018 | Nobuta | B29C 45/0005 264/328.18 |
| 2019/0284315 | A1* | 9/2019 | Rohatgi | C08F 8/00 |
| 2021/0001532 | A1* | 1/2021 | Fitzpatrick | B29C 45/76 |
| 2021/0128286 | A1* | 5/2021 | Jungnickel | B26B 21/528 |
| 2023/0046870 | A1* | 2/2023 | Bornemann | B29C 48/66 |

FOREIGN PATENT DOCUMENTS

| | | |
|---|---|---|
| JP | 2014-156075 A | 8/2014 |
| WO | 2012/056565 A1 | 5/2012 |

OTHER PUBLICATIONS

Communication dated Dec. 7, 2022 issued by the Austrian Patent Office in counterpart Austrian Patent Application No. A50810/2021.
Communication issued on Mar. 5, 2024 by the Japanese Patent Office for Japanese Patent Application No. 2020-172371.

* cited by examiner

A screw, an injection device, an injection mold-# SCREW FOR INJECTION MOLDING MACHINE, INJECTION DEVICE, AND INJECTION MOLDING MACHINE

CROSS-REFERENCE TO RELATED APPLICATIONS

This application is based on and claims priority under 35 USC 119 from Japanese Patent Application No. 2020-172371 filed on Oct. 13, 2020, the contents of which are incorporated herein by reference.

TECHNICAL FIELD

The present disclosure relates to a screw for injection molding machine with a step-shaped step portion, that is a land portion, formed on a top portion of a flight, an injection device provided with the screw, and an injection molding machine provided with the screw.

BACKGROUND

An injection device of an injection molding machine includes a heating cylinder and a screw inserted in a bore of the heating cylinder. A flight is formed on the screw to melt and measure an injection material, and the flight has various shapes.

For example, a screw described in Japanese Patent No. 4977258 (Patent Literature 1) includes a stepped flight on which a step-shaped step portion is formed on a top portion of the flight. In the stepped flight, at the top portion of the flight, an upstream side of the step portion, that is, a hopper side is a large diameter portion, and a downstream side, that is, an injection nozzle side is a land portion.

SUMMARY

The present inventors have found that there is a problem that the plasticization capacity of the screw provided with the stepped flight should be increased in an injection device provided with the screw described in Patent Literature 1. The screw provided with the stepped flight has an extrusion amount of the injection material smaller than that of a so-called conventional screw having no step-shaped step portion formed on the top portion of the flight and having the same diameter. This is because the gap between the heating cylinder and the bore at the top portion of the flight is small only at the large diameter portion, and the gap at the land portion is large. This is because a sealing effect at the top portion of the flight is smaller than that of the conventional screw.

Therefore, illustrative aspects of the present disclosure provide a screw, an injection device, and an injection molding machine having high plasticization capacity.

Aspect of non-limiting embodiments of the present disclosure relates to a screw of an injection molding machine having the following configuration. That is, a stepped flight is formed on the screw. The stepped flight is a flight in which a step-shaped step portion is formed at a top portion of the flight and a large diameter portion on an upstream side and a land portion on a downstream side are formed. When a gap ratio m of a gap $H_1$ between the land portion and a bore of a heating cylinder to a gap $H_2$ between the large diameter portion and the bore of the heating cylinder is defined as $H_1/H_2$, $2.3 \leq m \leq 6.4$ is selected.

According to an aspect of the present disclosure, when the gap ratio m is selected to be 2.3 or more and 6.4 or less for the screw including the stepped flight, an effect of increasing an extrusion amount can be obtained. That is, the plasticization capacity is improved.

DETAILED DESCRIPTION

Figure 1:
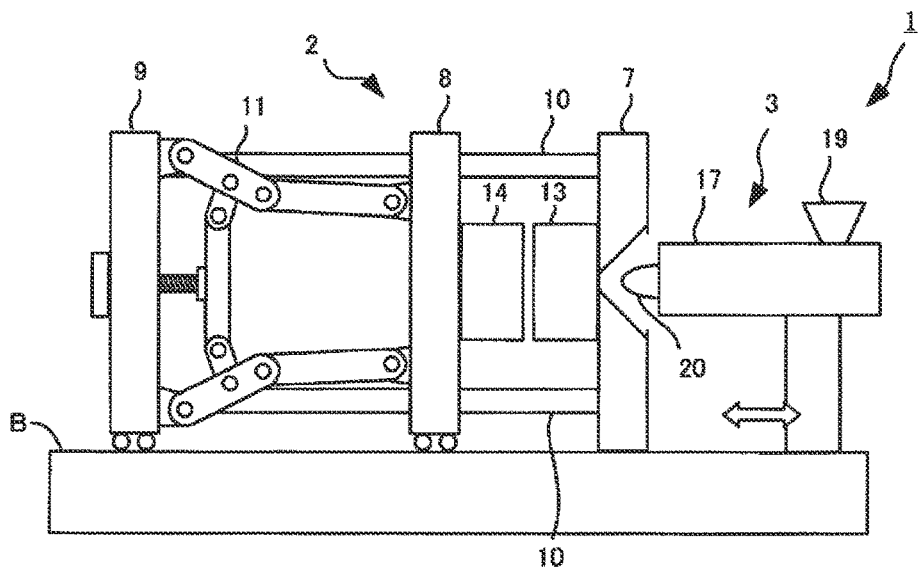
FIG. 1 is a front view showing an injection molding machine according to the present illustrative embodiment.

Hereinafter, a specific illustrative embodiment will be described in detail with reference to the drawings. However, the present disclosure is not limited to the following illustrative embodiment. The following description and drawings have been simplified as appropriate to clarify the description. In the drawings, the same elements are designated by the same reference numerals, and duplicate explanations are omitted as necessary. In addition, there is a portion where hatching is omitted such that the drawing is not complicated.

The present illustrative embodiment will be described.

Injection Molding Machine

As shown in FIG. 1, an injection molding machine 1 according to the present illustrative embodiment includes a mold clamping device 2 provided on a bed B, and an injection device 3 according to the present illustrative embodiment, which will be described later. The mold clamping device 2 includes a fixed plate 7, a movable plate 8, a mold clamping house 9, tie bars 10, 10, . . . , connecting the mold clamping house 9 and the fixed plate 7, and a mold clamping mechanism 11 formed of a toggle mechanism. Molds 13 and 14 are provided on the fixed plate 7 and the movable plate 8. When a mold clamping mechanism 11 is driven, the molds 13 and 14 are clamped.

Injection Device

Figure 2:
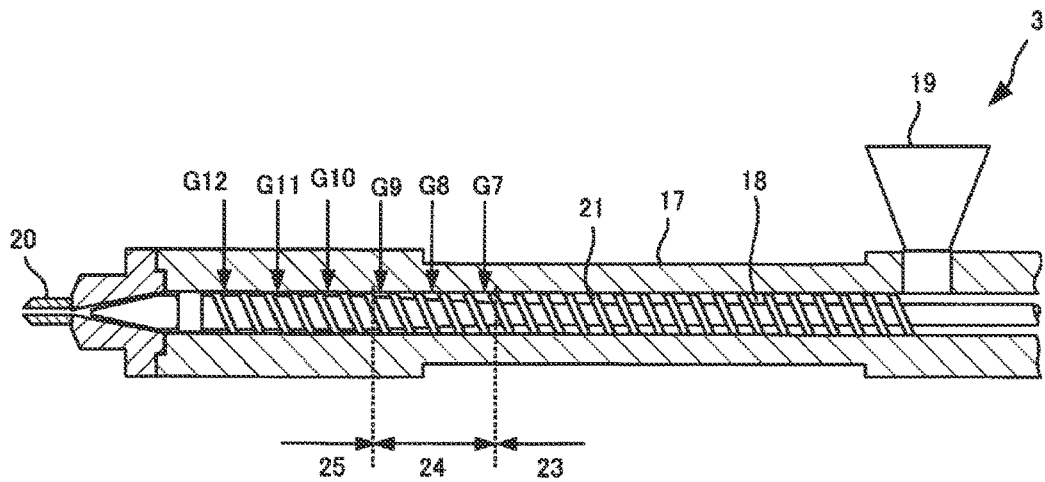
FIG. 2 is a front sectional view showing an injection device according to the present illustrative embodiment.

The injection device 3 according to the present illustrative embodiment is provided to be able to move forward and backward with respect to the mold clamping device 2, and injects an injection material into the molds 13 and 14 clamped by the mold clamping device 2. As shown in FIG. 2, the injection device 3 includes a heating cylinder 17 and a screw 18 according to the present illustrative embodiment. A hopper 19 is provided near a rear end portion of the heating cylinder 17, and an injection nozzle 20 is provided at a tip. When the injection material is charged into the hopper 19 and the screw 18 is rotated, the injection material is melted, sent forward, and measured. That is, in the injection device 3, a hopper 19 side is an upstream side and an injection nozzle 20 side is a downstream side.

Screw

The screw 18 according to the present illustrative embodiment is characterized in a part of the shape of a flight 21, and will be described below. As a whole, the screw 18 is as follows. A depth of a groove formed by the flight 21 of the screw 18 changes in each part of the screw 18, and the inside of the heating cylinder 17 is divided. That is, the groove is deeply formed on the upstream side of the screw 18 to serve as a supply portion 23 in which the injection material is sent downstream while being heated. Then, the depth of the groove gradually changes shallowly in the middle stream to serve as a compression portion 24 in which the injection material is compressed while being melted. The groove is shallowly formed on the downstream to serve as a measurement portion 25 in which the injection material is measured.

Figure 3:
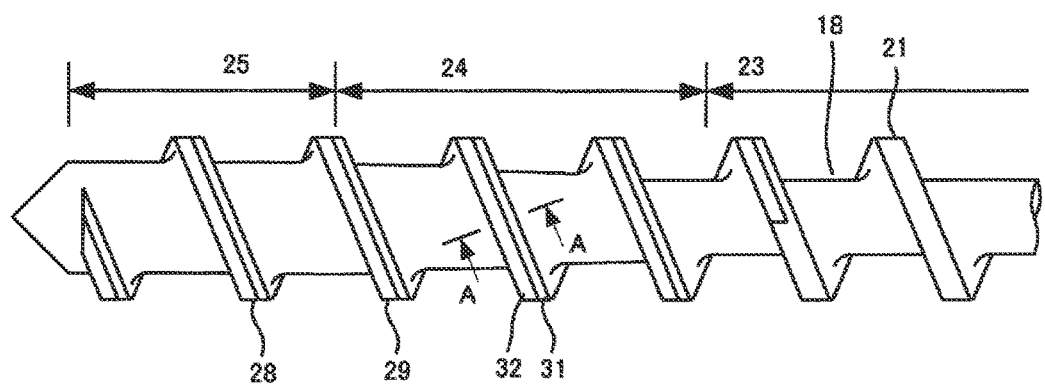
FIG. 3 is a front view showing a part of a screw according to the present illustrative embodiment.
Figure 4:
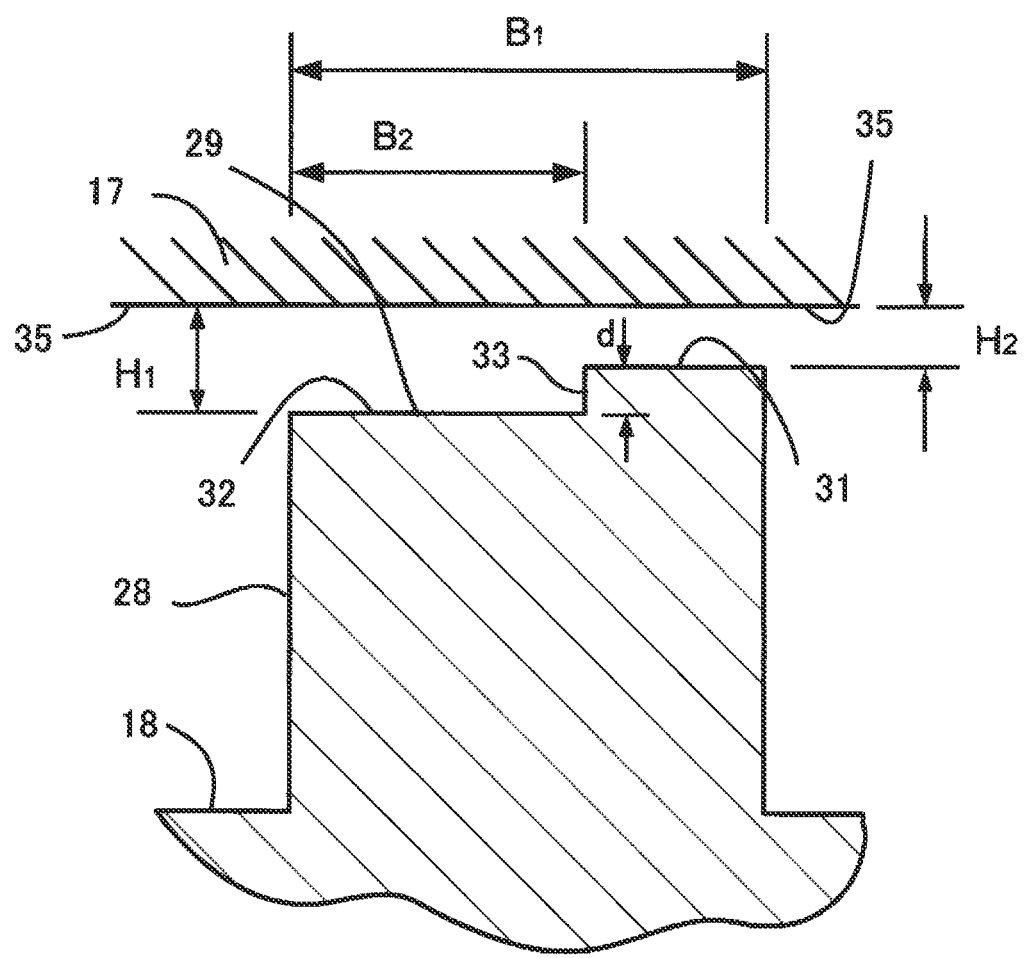
FIG. 4 is a sectional view showing a stepped flight provided in the screw according to the present illustrative embodiment.

A part of the screw 18 according to the present illustrative embodiment is enlarged and shown in FIG. 3, but the screw 18 is characterized in that a part of the flight 21 is a stepped flight 28. The stepped flight 28, whose cross section cut along the line A-A in FIG. 3 is shown in FIG. 4, is characterized by a top portion 29 thereof. That is, the stepped flight 28 is formed as a step-shaped step portion at the top portion 29, and includes a large diameter portion 31 on the upstream side and a land portion 32 on the downstream side. Since the land portion 32 has a smaller diameter by a step 33 than the large diameter portion 31, a gap $H_1$ between a bore 35 of the heating cylinder 17 and the land portion 32 is larger than a gap $H_2$ between the large diameter portion 31 and the bore 35 of the heating cylinder 17. Since the stepped flight 28 is formed in this way, the molten injection material enters, an appropriate lubrication pressure is generated at the top portion 29, and the heating cylinder 17 and the screw 18 are prevented from coming into contact with each other.

In this illustrative embodiment, the stepped flight 28 is provided in the compression portion 24 and the measurement portion 25. This is because when the screw 18 rotates, the screw 18 may swing and a rotation shaft thereof may be eccentric from an axis of the heating cylinder 17, and a degree of amplitude is relatively large in the compression portion 24, and is second large in the measurement portion 25 next to the compression portion 24. Therefore, the stepped flight 28 is provided in these portions. However, even when the stepped flight 28 is provided only in the compression portion 24 having a large degree of amplitude, the effect of preventing the contact between the heating cylinder 17 and the screw 18 can be obtained.

When the screw 18 rotates to send the injection material forward, in the stepped flight 28, the land portion 32 is formed as compared with the flight of the conventional screw, the injection material easily flows due to the large gap $H_1$, and the plasticization capacity is lower than that of the conventional screw. However, the screw 18 according to the present illustrative embodiment is characterized by a numerical range of the gap ratio m, and has high plasticization capacity regardless of a fact that the stepped flight 28 is provided. The gap ratio m is the ratio of the gap $H_1$ to the gap $H_2$, that is, $m=H_1/H_2$, and is specifically selected in the following numerical range.

$$2.3 \le m \le 6.4 \qquad \text{(numerical range A)}$$

Thus, when the gap ratio m is selected, the plasticization capacity is improved. This fact has been revealed by an experiment described later. However, according to the theoretical study based on a model described below, the ideal range of the gap ratio m is 1.65 or more and 2.15 or less. This is because a high lubrication pressure can be obtained in this range. The numerical range A of the gap ratio m selected in the present illustrative embodiment is a range of values larger than the above ideal range.

Two questions arise here. The first question is that the plasticization capacity is higher than that of the screw in the ideal range regardless of a fact that the numerical range A is larger than the ideal range. The larger the gap ratio m is, the larger the gap $H_1$ is in the land portion 32, the easier the resin material flows, and the smaller the plasticization capacity should be. However, this is contrary to this expectation. The second question is that whether the required lubrication pressure is generated even when the gap ratio m is out of the ideal range. Regarding the first question, as described above, it is found by the experiment that the screw 18 according to the present illustrative embodiment has plasticization capacity higher than that of the screw having a gap ratio m in the ideal range. Regarding the second question, it is confirmed by the experiment that the required lubrication pressure can be obtained. These will be described.

First, the behavior of the injection material in the stepped flight 28 is theoretically studied by using a model.

Mechanism of Generating Lubrication Pressure and Lubrication Load Capacity W

First, the mechanism of generating the lubrication pressure in the stepped flight 28 will be described, and a repulsive force that prevents the top portion 29 of the stepped flight 28 from coming into contact with the bore of the heating cylinder 17, that is, lubrication load capacity W, will be expressed by a mathematical formula.

When the screw 18 rotates in the heating cylinder 17, the stepped flight 28 is driven at a predetermined speed with respect to the bore of the heating cylinder 17, and this speed can be divided into a component parallel to the stepped flight 28 and a component perpendicular to the stepped flight 28.

Figure 5:
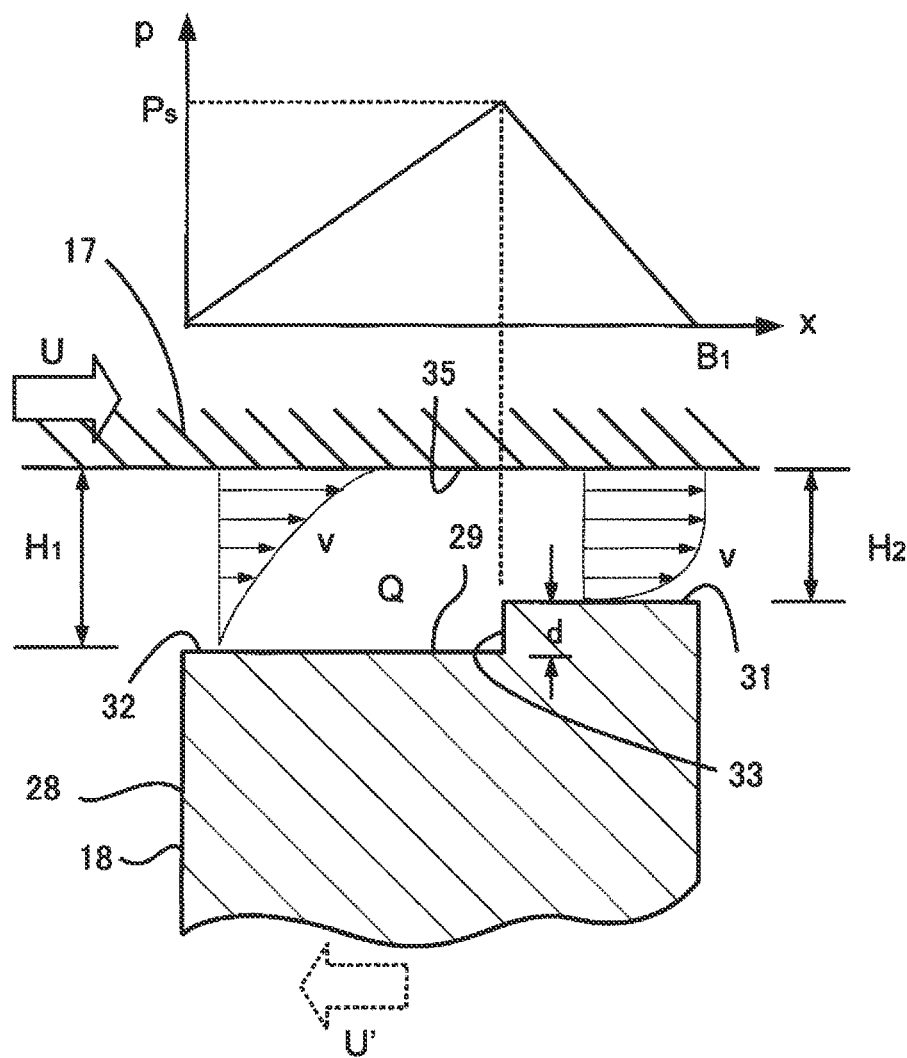
FIG. 5 is a sectional view showing the stepped flight provided in the screw according to the present illustrative embodiment, and a graph showing a lubrication pressure generated at a top portion of the stepped flight due to an injection material flowing into a gap between the stepped flight and a bore of a heating cylinder.

Considering the component perpendicular to the stepped flight 28, as shown in FIG. 5, the stepped flight 28 appears to move at a speed U' to the left with respect to the heating cylinder 17. Assuming that the stepped flight 28 is fixed, it can be considered that the heating cylinder 17 is moving to the right at a speed U. The speed U has the same magnitude as the speed U' and has a direction opposite to that of the speed U'.

The molten injection material enters the gap $H_1$ and is discharged from the gap $H_2$. At this time, the lubrication pressure is generated. The distribution of a speed v of the injection material in the gaps $H_1$ and $H_2$ is schematically shown in FIG. 5. A lubrication pressure p reaches a maximum value Ps at a boundary between the large diameter portion 31 and the land portion 32, that is, near the step portion, and is substantially zero on both end surfaces of the stepped flight 28. Then, the lubrication pressure p changes linearly in each of the large diameter portion 31 and the land portion 32. The reason why the lubrication pressure p changes linearly is that the flow of the molten resin having a high viscosity is a laminar flow, and the laminar flow loses the pressure in proportion to the flowing distance.

Figure 6:
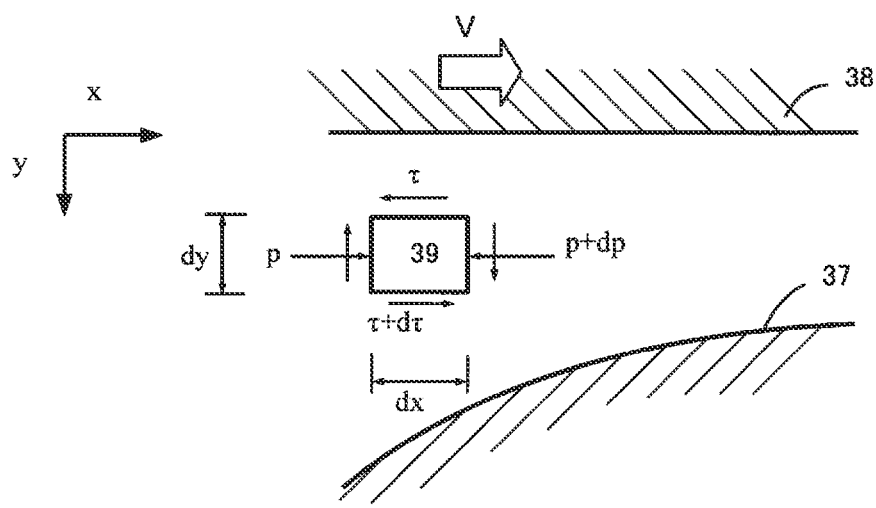
FIG. 6 is a diagram schematically showing a behavior of a viscous fluid flowing in a gap between a movable piece and a fixed piece.

Here, the general behavior of a viscous fluid between two planes that move relatively is considered. FIG. 6 shows a model including a fixed piece 37 and a movable piece 38 that slides at a speed V relative to the fixed piece 37. A Newtonian fluid is filled between the fixed piece 37 and the moving piece 38. Considering the balance of the forces acting on a minute element 39 of the fluid, an equation 1 can be obtained from the balance of the forces in an x-axis direction. Here, p is the pressure and T is a shearing force.

$$\frac{dp}{dx} = \frac{d\tau}{dy} \quad \text{(Equation 1)}$$

The shearing force T is given by an equation 2, where p is the viscosity of the fluid and v is the flow speed of the fluid in the x direction.

$$\tau = \mu \frac{\partial v}{\partial y} \quad \text{(Equation 2)}$$

Equation 3 can be obtained from the equation 1 and the equation 2.

$$\frac{dp}{dx} = \mu \frac{\partial^2 v}{\partial y^2} \quad \text{(Equation 3)}$$

The equation 3 can also be obtained from the so-called Navier-Stokes equation, which represents a steady flow of an incompressible fluid.

When the gap between the fixed piece 37 and the movable piece 38 in a y direction is defined as h, the speed v of the fluid is 0 when y=h. Further, when y=0, the speed v of the fluid is V. When the equation 3 is solved with these conditions as the boundary conditions, an equation 4 which is a relational expression between the flow speed v and the pressure distribution is obtained.

$$v = V \frac{h-y}{h} - \frac{1}{2\mu} \frac{dp}{dx} h(h-y) \quad \text{(Equation 4)}$$

Considering the unit width perpendicular to the paper surface, a flow rate Q of the fluid flowing through the gap h is given by an equation 5 obtained by integrating the equation 4.

$$Q = \int_0^h v\,dy = \frac{Vh}{2} - \frac{h^3}{12\mu} \frac{dp}{dx} \quad \text{(Equation 5)}$$

A flow rate Qx of the molten resin flowing through the gap $H_1$ and the gap $H_2$ in the model shown in FIG. 5 is calculated by the equation 5. The flow rate Qx is equal in the gap $H_1$ and the gap $H_2$. Here, when a flight width of the stepped flight 28 is defined as $B_1$ and a width of the land portion 32 is defined as $B_2$, a pressure gradient dp/dx is given by $P_s/B_2$ in the gap $H_1$ and is given by $(0-P_s)/(B_1-B_2)$ in the gap $H_2$.

Thus, the flow rate Qx is given by an equation 6.

$$Q_x = -\frac{H_1^3}{12\mu}\frac{P_s}{B_2} + \frac{H_1}{2}U = -\frac{H_2^3}{12\mu}\frac{0-P_s}{B_1-B_2} + \frac{H_2}{2}U \quad \text{(Equation 6)}$$

When the equation 6 is solved for the maximum value Ps of the lubrication pressure, an equation 7 is obtained.

$$P_s = \frac{12\mu B_2(B_1-B_2)}{H_1^3(B_1-B_2)+H_2^3 B_2}\frac{1}{2}U(H_1-H_2) = \\ \frac{6\mu U B_2(B_1-B_2)(H_1-H_2)}{H_1^3(B_1-B_2)+H_2^3 B_2} \quad \text{(Equation 7)}$$

The lubrication load capacity W per unit length in the stepped flight 28 is obtained by integrating the lubrication pressure p in a width direction of the stepped flight 28. As shown in FIG. 5, the lubrication pressure p changes like a triangle having a base length of $B_1$ and a height of Ps. Thus, the load capacity W is given as the area of the triangle. The load capacity W calculated in this way is shown in an equation 8.

$$W = \frac{\mu U B_1^2}{H_2^2} K_w \quad \text{(Equation 8)}$$

$$K_w = \frac{3\beta(1-\beta)(m-1)}{m^3(1-\beta)+\beta}$$

$$m = \frac{H_1}{H_2}$$

$$\beta = \frac{B_2}{B_1}$$

Kw is a load capacity coefficient, m is the gap ratio, that is, the ratio between the gaps $H_1$ and $H_2$, and β is a shape factor, that is, a ratio of the flight width $B_1$ to the width $B_2$ of the land portion 32.

In the stepped flight 28, a repulsive force is generated between the top portion 29 and the bore of the heating cylinder 17 due to the lubrication load capacity W represented by the equation 8, and the contact therebetween is prevented.

Figure 7:
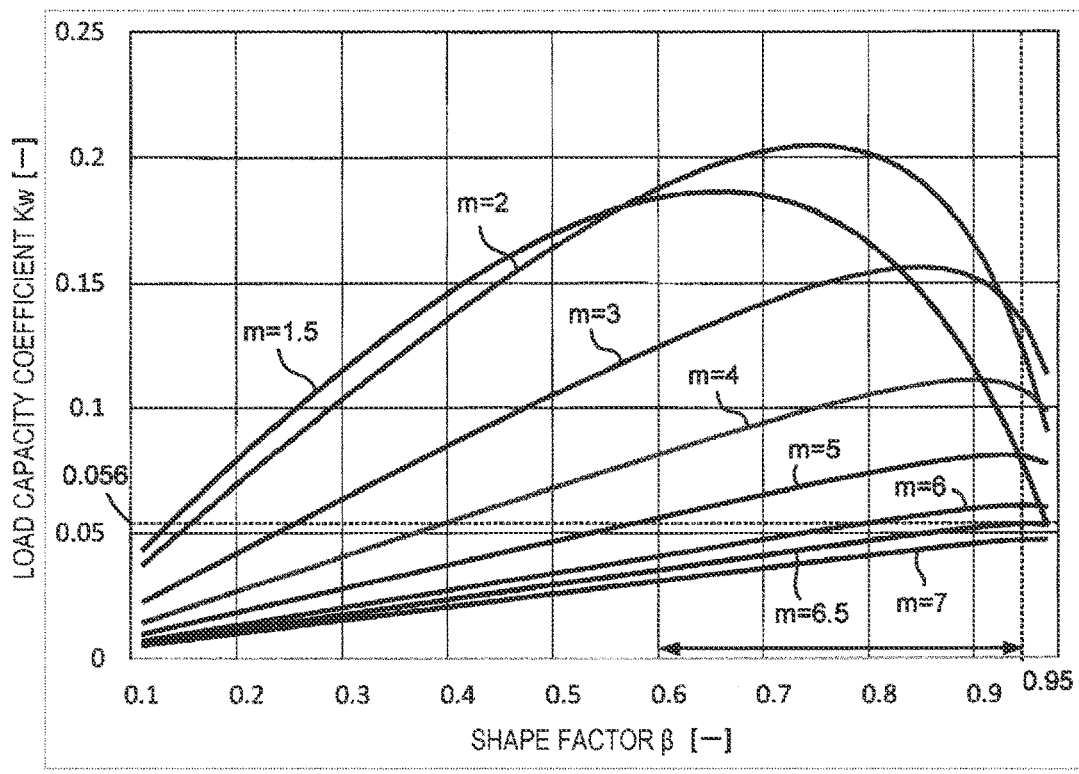
FIG. 7 is a graph showing a change in load capacity coefficient with respect to the lubrication pressure at the top portion of the flight when a shape factor β is changed in the stepped flight.
Figure 8:
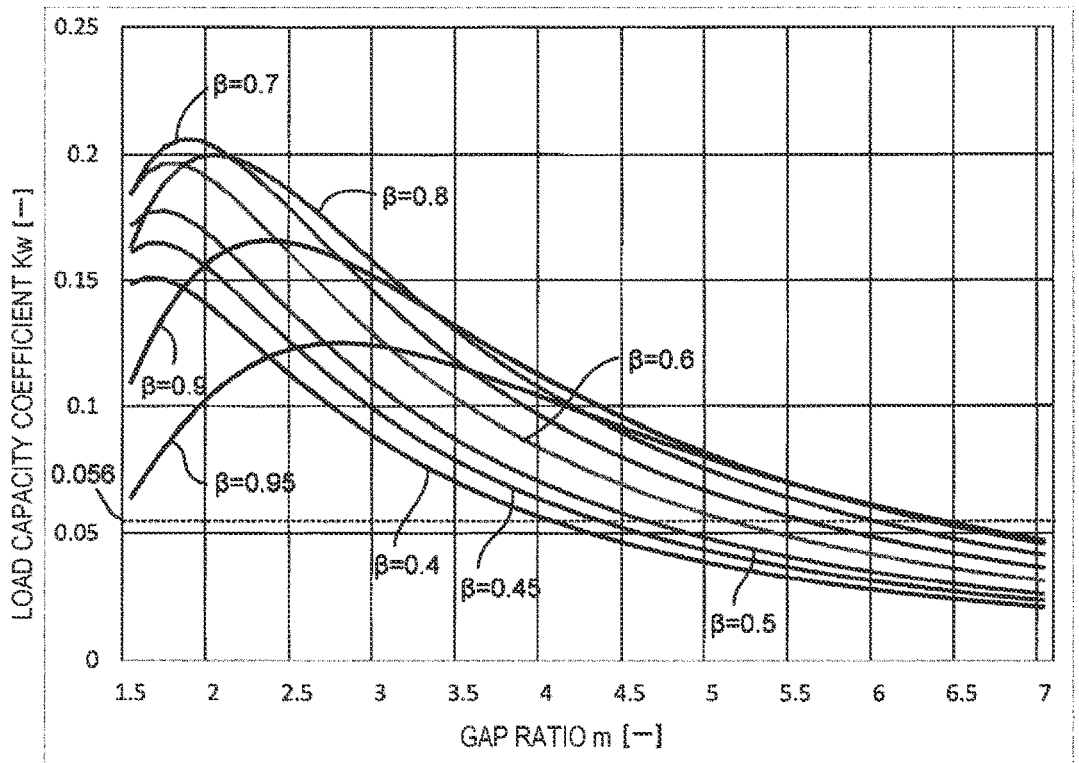
FIG. 8 is a graph showing a change in load capacity coefficient with respect to the lubrication pressure at the top portion of the flight when a gap ratio m is changed in the stepped flight.

The lubrication load capacity W is proportional to the load capacity coefficient Kw, and the load capacity coefficient Kw changes depending on the gap ratio m, which is the ratio between the gaps $H_1$ and $H_2$, and the shape factor $\beta$, which is the ratio of the flight width $B_1$ to the width $B_2$ of the land portion 32. Therefore, a graph in FIG. 7 shows a change of the load capacity coefficient Kw given by the equation 8 when the shape factor $\beta$ changes with respect to various gap ratios m. Further, a graph in FIG. 8 shows a change of the load capacity coefficient Kw when the gap ratio m changes with respect to various shape factors $\beta$.

The load capacity coefficient Kw is 0.2 or more when the gap ratio m and the shape factor $\beta$ are as follows.

$$1.65 \leq m \leq 2.15$$
$$0.63 \leq \beta \leq 0.79$$

At this time, the load capacity W is the largest, and a high lubrication pressure ensures that the top portion 29 of the stepped flight 28 is prevented from coming into contact with the bore 35 of the heating cylinder 17. The above is the theoretical study for the model.

As described above, in the stepped flight 28 of the screw 18 according to the present illustrative embodiment, the gap ratio m is selected in the numerical range A. Such selection is based on the following experiment.

A first experiment will be described.

First Experiment

Object of Experiment

To clarify a relationship between the gap ratio m and the plasticization capacity in the screw 18 including the stepped flight 28.

Preparation for Experiment

A heating cylinder 17 having an inner diameter of 91.8 mm and five screws X, Y, A, B, and C having the same screw diameter and the same flight groove depth were prepared. The screw X was a conventional screw having a flat flight top portion, and the screws Y and A to C were the screw 18 according to the present illustrative embodiment in which the stepped flight 28 was formed in the compression portion 24 and the measurement portion 25. For the screws Y, A, B, and C, the gap ratio $m=H_1/H_2$ was changed. Specifically, the gap ratio was set to 2.00, 2.33, 4.33, and 6.33, respectively.

Method in Experiment

The screws X, Y, A, B, and C were sequentially set in the heating cylinder 17, polypropylene (PP) and polyethylene (PE) were supplied as resin materials, and the extrusion amount was measured. The extrusion amount is an index for evaluating the plasticization capacity when the numbers of rotation of the screws are the same. That is, it can be said that the larger the extrusion amount, the higher the plasticization capacity. The extrusion amount was measured under the following conditions 1 and 2.

"Condition 1": the screw was rotated for 90 seconds and the weight of the extruded resin material was measured.

"Condition 2": the screw was rotated for 10 seconds and stopped for 10 seconds, the screw was rotated for 10 seconds and stopped for 10 seconds, . . . , such a process was repeated 10 times, and the weight of the extruded resin material was measured.

The experimental results are shown in Table 1.

TABLE 1

|  |  | Screw X | Screw Y | Screw A | Screw B | Screw C |
|---|---|---|---|---|---|---|
| Gap ratio m ($H_1/H_2$) |  | — | 2.00 | 2.33 | 4.33 | 6.33 |
| PP | Condition 1 | 4568 | 3996 | 4207 | 4385 | 4501 |
|  | Condition 2 | 5386 | 4925 | 5036 | 5148 | 5388 |
| PE | Condition 1 | 5806 | 5343 | 5410 | 5657 | 5764 |
|  | Condition 2 | 6838 | 6310 | 6455 | 6487 | 6769 |

Unit: g

Study on Experiment

The gap ratio m of the screw Y is within the ideal numerical range obtained by theoretical study for the model, but the extrusion amount thereof is smaller than that of the screw X, which is a conventional screw. In contrast, the gap ratio m of the screws A, B, and C is larger than the ideal numerical range, but the extrusion amount thereof is larger than that of the screw Y.

Considering a flow rate $Q_1$ of the injection material flowing through the gap $H_1$ of the land portion 32 based on the equation 5, the following equation 9 can be obtained.

$$Q_1 = \frac{V \cdot H_1}{2} - \frac{H_1^3}{12\mu}\frac{dp}{dx} \quad \text{(Equation 9)}$$

Originally, as the gap ratio m increases, the gap $H_1$ inevitably increases, so that the flow rate $Q_1$ should increase from the first term of the equation 9. Since the flow rate $Q_1$ is considered to be a leak of the injection material at the top portion 29 of the flight 21, the extrusion amount should decrease as the gap ratio m increases. However, the results of this experiment show an effect opposite to this expectation.

Figure 10:
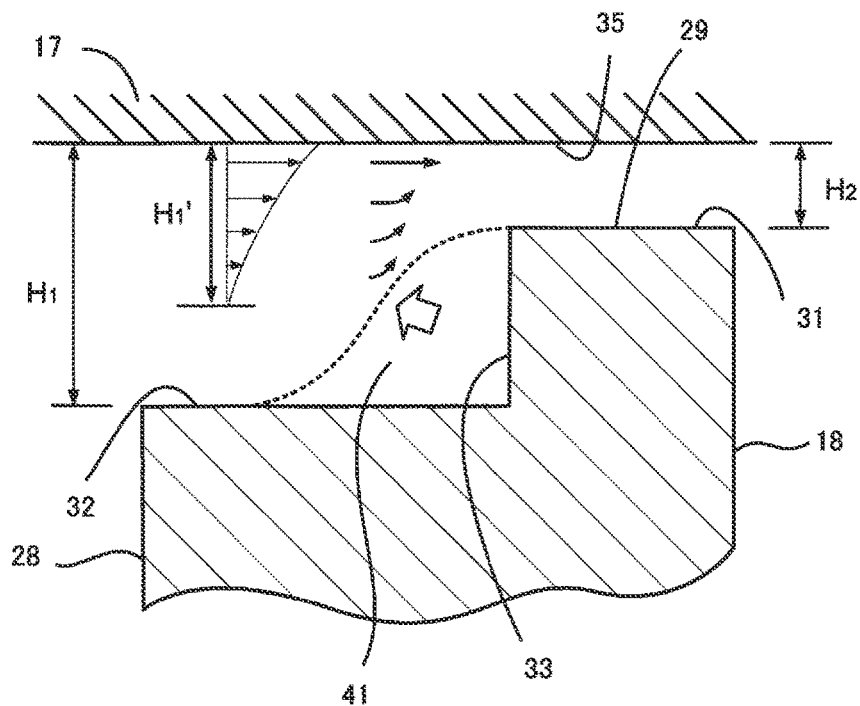
FIG. 10 is a sectional view showing the stepped flight of the screw according to the present illustrative embodiment, which is provided in the heating cylinder.

A study will be made with reference to FIG. 10. When the gap ratio m is large, that is, when the gap $H_1$ is larger than the gap $H_2$, it is considered that the injection material is stagnated in a region indicated by reference numeral 41 near the step 33. This stagnation causes the effect of pushing back the injection material, and the thickness of the flow of the injection material in the land portion 32 is thin. As a result, an apparent gap $H_1'$ is smaller than the actual gap $H_1$. Therefore, it is considered that the flow rate $Q_1$ represented by the equation 9 is smaller. It is considered that the larger the gap ratio m, the larger the stagnation region 41, and the smaller the apparent gap $H_1'$ as compared to the actual gap $H_1$, and as a result, the flow rate $Q_1$ is smaller and the extrusion amount is larger.

Summary of Experiment

It is found that, in the screws 18 each including the stepped flight 28, the screws A, B, and C having a gap ratio m of 2.33, 4.33, and 6.33 all have plasticization capacity higher than that of the screw Y having a gap ratio m of 2.00. From the viewpoint of the plasticization capacity, it can be said that the above numerical range A is preferable as the gap ratio m. The gap ratio m is more preferably 2.3 or more and 4.3 or less.

Next, a second experiment was conducted to confirm whether the required lubrication pressure was generated for the screw 18 having the gap ratio m in such a numerical range A.

Second Experiment

Object of Experiment

To confirm whether the lubrication pressure is appropriately generated to prevent the top portion 29 of the flight 21 from coming into contact with the bore 35 when the screw 18 whose gap ratio m is in the numerical range A rotates in the heating cylinder 17 and the amount of the injection material is measured.

Preparation for Experiment

As shown in FIG. 2, in the injection device 3 according to the present illustrative embodiment, sensors for detecting a distance to the screw were embedded in a plurality of locations G7, G8, . . . , G12 of the heating cylinder 17. The locations G7 to G9 correspond to the compression portion 24, and the locations G10 to G12 correspond to the measurement portion 25. As the screw, the screws X, A, B, and C used in Experiment 1 were prepared.

Procedure and Results of Experiment

Figure 9:
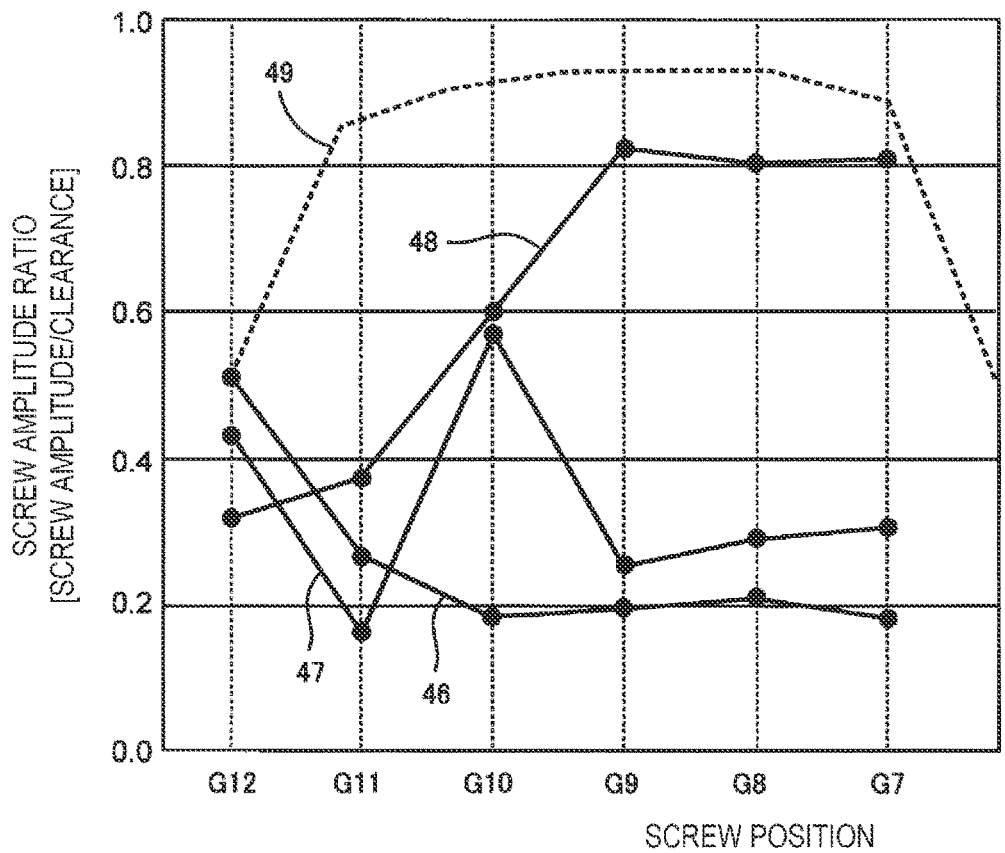
FIG. 9 is a graph showing a degree of amplitude of the screw at different screw positions of each of three screws including stepped flights having different gap ratios m and a conventional screw, based on a fact that when the screw is rotated in the heating cylinder, the screw swings and a rotation shaft thereof is eccentric with respect to a central axis of the heating cylinder.

In the heating cylinder 17, the screws X, A, B, and C were sequentially provided and rotated and the amount of the injection material was measured. At this time, the screw amplitude ratio at each location was obtained from the distance to the screw detected at each location G7, G8, . . . , G12. The results are shown in the graph in FIG. 9. Reference numerals 46, 47, and 48 are graphs of the screws A. B, and C, that is, graphs having a gap ratio m of 2.33, 4.33, and 6.33, respectively. Reference numeral 49 is a graph of the screw X, that is, a graph of the conventional screw. The screw amplitude ratio is 0.0 when the central axis of the screw 18 coincides with the central axis of the heating cylinder 17, and 1.0 when the screw 18 and the bore of the heating cylinder 17 come into contact with each other. From the graphs in FIG. 9, the screw amplitude ratio of the present illustrative embodiment is in the range of 0.17 to 0.82.

Study

Figure 11:
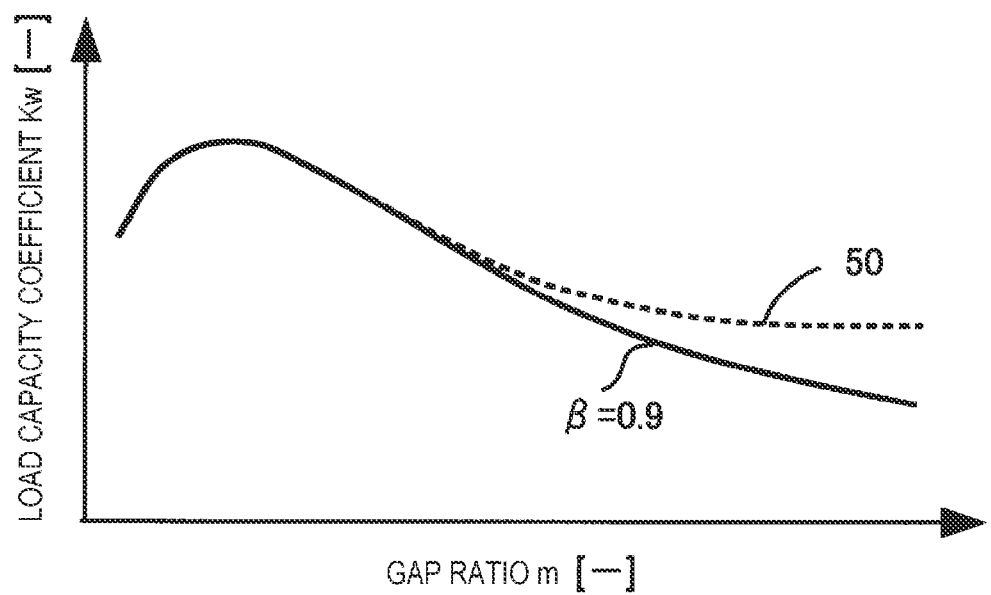
FIG. 11 is a graph showing a relationship between the gap ratio m and the load capacity coefficient.

It is confirmed that the screw amplitude ratio of the screw C having a gap ratio m of 6.4 is sufficiently smaller than that of the conventional screw, and the required lubrication pressure can be obtained. However, this screw C has a shape factor β of 0.94 and a load capacity coefficient Kw of 0.056 from the theoretical equation 8 and is theoretically expected to not necessarily provide a sufficient lubrication pressure. However, in practice, it has been confirmed by experiments that the required lubrication pressure is obtained. Presuming the reason, it is probably because the apparent gap $H_1'$ is smaller than the gap $H_1$ in the land portion 32 when the gap ratio n is large, as studied in FIG. 10 in the first experiment. Then, this is because, for example, the graph showing the relationship between the gap ratio m and the load capacity coefficient Kw when the shape factor β shown in FIG. 8 is 0.9 is actually as shown by a dotted line graph 50, as schematically shown in FIG. 11.

Summary of Experiment

It is confirmed that in the screws 18 each including the stepped flight 28, the screws A, B, and C having a gap ratio m of 2.33, 4.33, and 6.33 all obtain a required lubrication pressure, and appropriately prevent the contact with the bore 35 of the heating cylinder 17. It is found that selecting the gap ratio m from the numerical range A has no problem from the viewpoint of obtaining a necessary lubrication pressure.

From the second experiment, it is found that a sufficient lubrication pressure is obtained even when the shape factor β is 0.94. As can be seen from the graph in FIG. 8 that when the shape factor β is 0.5 and the value of the gap ratio m is 4.6 or less, the theoretical load capacity coefficient Kw is 0.056 or more, and when the shape factor β is 0.6 and the gap ratio m is 5.2 or less, the theoretical load capacity coefficient Kw is 0.056 or more. Further, when the shape factor β is 0.95 and the value of the gap ratio m is 6.5 or less, the theoretical load capacity coefficient Kw is 0.056 or more. It is found that when the gap ratio m is large, the actual load capacity coefficient Kw becomes larger than the theoretical value, and the necessary lubrication pressure is obtained. Then, it can be said that the range of the shape factor β is preferably 0.5 or more and 0.95 or less.

Figure 12:
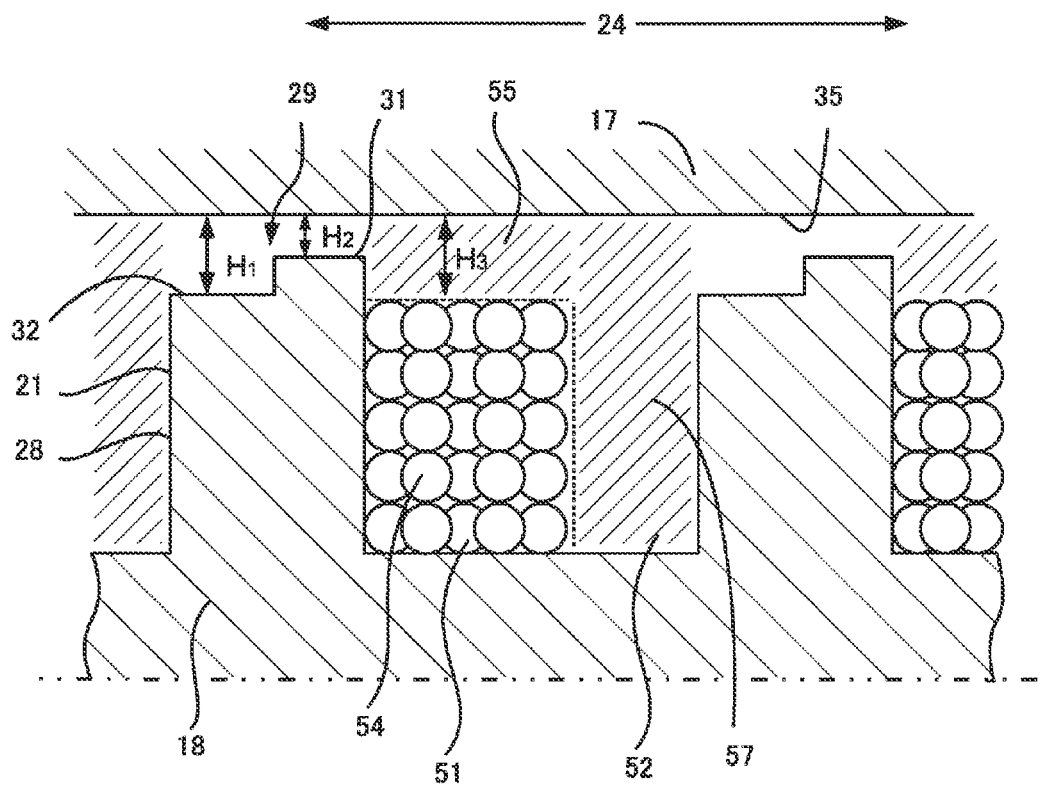
FIG. 12 is a sectional view showing an upper half of the stepped flight of the screw according to the present illustrative embodiment, which is provided in the heating cylinder, above the central axis of the screw.

Next, preferred conditions for the diameter of the screw 18 will be studied. In the compression portion 24, an injection material 51 in a solid state and an injection material 52 in a molten state are mixed in the heating cylinder 17, as shown in FIG. 12. The injection material 51 in a solid state is stacked on a back portion of the flight 21, that is, on the upstream side, thereby forming a solid bed 54. A melt film 55 made of a molten injection material is formed between the solid bed 54 and the bore 35 of the heating cylinder 17, and a melt pool 57 made of a molten injection material is formed on the upstream side of the solid bed 54.

When the screw 18 rotates, a lubrication pressure is generated at the top portion 29 of the stepped flight 28 as described above, but a negative pressure is generated at the melt film 55. This negative pressure causes the screw 18 to swing when the screw 18 rotates, and the magnitude of the negative pressure increases as a thickness $H_3$ of the melt film 55 is smaller. That is, when the thickness $H_3$ of the melt film 55 is small, there is a risk that the screw 18 comes into contact with the bore 35 of the heating cylinder 17.

The thickness $H_3$ of the melt film 55 is larger as the diameter of the screw 18 increases. That is, as the injection device 3 is larger, the thickness $H_3$ of the melt film 55 is larger. This is because the larger the machine, the more efficiently the injection material needs to be melted, and the more efficiently the heating cylinder 17 is heated. Further, the larger the machine, the smaller the rotation speed of the screw 18, and the longer it takes for the injection material to melt. In the industry, it is common to use a screw 18 having a diameter of 70 mm or more as a large machine. For the screw 18 having a diameter of 70 mm or more, the thickness $H_3$ of the melt film 55 is sufficiently large, and the influence of the negative pressure due to the melt film 55 does not need to be considered. Therefore, the diameter of the screw 18 is preferably 70 mm or more. For example, the diameter of the large diameter portion 31 of the screw 18 is 70 mm or more. The diameter of the large diameter portion 31 of the screw 18 is, for example, 450 mm or less, preferably 200 mm or less, and more preferably 130 mm or less.

Although the invention made by the present inventor has been specifically described above based on the illustrative embodiment, it is needless to say that the present invention is not limited to the illustrative embodiment described above, and various modifications can be made without departing from the scope of the present invention. The plurality of examples described above can be implemented in combination as appropriate.

What is claimed is:

1. An apparatus comprising:
    a cylinder having a bore; and
    a screw that is insertable into the bore of the cylinder, the screw comprising:
        a flight,
        wherein a step-shaped step portion is formed on a top portion of the flight of a part of the screw, and the flight on which the step-shaped step portion is formed is a stepped flight;
        wherein the stepped flight includes a large diameter portion on an upstream side and a land portion on a downstream side, and
        wherein a gap ratio $m=H_1/H_2$ is 2.3 or more and 4.33 or less,
        wherein gap $H_1$ is the distance between the land portion and the bore,
        wherein gap $H_2$ is the distance between the large diameter portion and the bore,
        wherein for a flight width $B_1$ in a direction perpendicular to a lead angle and a width B2 of the land portion in the stepped flight, the width $B_2$ is 0.5 times or more and 0.95 times or less of the width $B_1$, and
        wherein the flight width B1 and the width B2 of the land portion in the stepped flight are directed from downstream to upstream of the screw.

2. The apparatus according to claim 1,
    wherein a diameter of the large diameter portion is 70 mm or more.

3. The apparatus according to claim 1,
    wherein when the screw rotates in the heating cylinder, an inside of the heating cylinder is divided into:
        a supply portion on the upstream side from which an injection material is supplied;
        a compression portion in which the injection material is compressed while being melted; and
        a measurement portion in which the injection material in a molten state is measured, and
    wherein the stepped flight is formed in the compression portion.

4. The apparatus according to claim 3,
    wherein the stepped flight is formed in the measurement portion.

5. An injection device, comprising:
    a heating cylinder having a bore; and
    a screw,
    wherein in the screw, a step-shaped step portion is formed on a top portion of a flight of a part of the screw, the flight of a part of the screw is formed to be a stepped flight,
    wherein the stepped flight includes a large diameter portion on an upstream side and a land portion on a downstream side, and
    wherein a gap ratio $m=H_1/H_2$ is 2.3 or more and 4.33 or less,
    wherein gap $H_1$ is the distance between the land portion and the bore,
    wherein gap $H_2$ is the distance between the large diameter portion and the bore,
    wherein for a flight width $B_1$ in a direction perpendicular to a lead angle and a width $B_2$ of the land portion in the stepped flight, the width $B_2$ is 0.5 times or more and 0.95 times or less of the width $B_1$, and
    wherein the flight width B1 and the width B2 of the land portion in the stepped flight are directed from downstream to upstream of the screw.

6. The injection device according to claim 5,
    wherein a diameter of the large diameter portion is 70 mm or more.

7. The injection device according to claim 5,
    wherein when the screw rotates in the heating cylinder, an inside of the heating cylinder is divided into:
        a supply portion on the upstream side from which an injection material is supplied;
        a compression portion in which the injection material is compressed while being melted; and
        a measurement portion in which the injection material in a molten state is measured, and
    wherein the stepped flight is formed in the compression portion.

8. The injection device according to claim 7,
    wherein the stepped flight is formed in the measurement portion.

9. An injection molding machine comprising:
    A mold clamping device configured to clamp a mold, the mold clamping device including a fixed plate, a moveable plate, a mold clamping house, and a mold clamping mechanism formed of a toggle mechanism, the mold including a movable-side mould provided on the fixed plate and a fixed-side mold provided on the moveable plate, and the mold clamping mechanism being driven to clamp the fixed-side mold and the movable-side mold; and
    an injection device including a heating cylinder having a bore and a screw, the injection device being configured to inject an injection material into the mold,
    wherein a step-shaped step portion is formed on a top portion of a flight of a part of a screw to be a stepped flight,
    wherein the stepped flight includes a large diameter portion on an upstream side and a land portion on a downstream side, and
    wherein a gap ratio $m=H_1/H_2$ is 2.3 or more and 4.33 or less,
    wherein gap $H_1$ is between the land portion and the bore;
    wherein gap $H_2$ is the distance between the large diameter portion and the bore,
    wherein for a flight width $B_1$ in a direction perpendicular to a lead angle and a width B2 of the land portion in the stepped flight, the width $B_2$ is 0.5 times or more and 0.95 times or less of the width $B_1$, and wherein the flight width B1 and the width B2 of the land portion in the stepped flight are directed from downstream to upstream of the screw.

10. The injection molding machine according to claim 9, wherein a diameter of the large diameter portion is 70 mm or more.

11. The injection molding machine according to claim 9, wherein when the screw rotates in the heating cylinder, an inside of the heating cylinder is divided into:
   a supply portion on the upstream side from which an injection material is supplied;
   a compression portion in which the injection material is compressed while being melted; and
   a measurement portion in which the injection material in a molten state is measured, and
wherein the stepped flight is formed in the compression portion.

12. The injection molding machine according to claim 11, wherein the stepped flight is formed in the measurement portion.

* * * * *